United States Patent
Maeda

(10) Patent No.: US 10,291,801 B2
(45) Date of Patent: May 14, 2019

(54) IMAGE SCANNING APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventor: Takashi Maeda, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/935,135

(22) Filed: Mar. 26, 2018

(65) Prior Publication Data
US 2018/0288253 A1 Oct. 4, 2018

(30) Foreign Application Priority Data

Apr. 1, 2017 (JP) ................................ 2017-073324

(51) Int. Cl.
| | |
|---|---|
| *H04N 1/00* | (2006.01) |
| *H04N 1/10* | (2006.01) |
| *H04N 1/031* | (2006.01) |
| *H04N 1/047* | (2006.01) |

(52) U.S. Cl.
CPC ..... *H04N 1/00551* (2013.01); *H04N 1/00408* (2013.01); *H04N 1/0311* (2013.01); *H04N 1/0473* (2013.01); *H04N 1/1061* (2013.01)

(58) Field of Classification Search
None
See application file for complete search history.

(56) References Cited

U.S. PATENT DOCUMENTS

| | | | | |
|---|---|---|---|---|
| 5,726,769 | A * | 3/1998 | Imai | H04N 1/00204 358/442 |
| 7,688,477 | B2 * | 3/2010 | Ikeno | H04N 1/00681 358/449 |
| 9,420,136 | B1 * | 8/2016 | Misaka | H04N 1/00708 |
| 2005/0219646 | A1 | 10/2005 | Susaki | |
| 2006/0250661 | A1 * | 11/2006 | Susaki | H04N 1/401 358/461 |
| 2007/0058219 | A1 * | 3/2007 | Yamaguchi | H04N 1/00795 358/497 |

(Continued)

FOREIGN PATENT DOCUMENTS

| | | |
|---|---|---|
| JP | 2005-295084 A | 10/2005 |
| JP | 2009-038654 A | 2/2009 |

(Continued)

*Primary Examiner* — Anh-Vinh T Nguyen
(74) *Attorney, Agent, or Firm* — Scully, Scott, Murphy & Presser, PC

(57) ABSTRACT

An image scanning apparatus includes a controller configured to execute a first operation of checking whether a standby position is coincident with a home position in response to determining that an open signal is not output from a cover sensor while an image scanner is changing a scanning position from a scanning end position toward a scanning start position after completion of image scanning, and to execute a second operation in response to determining that the open signal is output from the cover sensor while the image scanner is changing the scanning position, the second operation including moving the scanning position to a particular position between the standby position and the scanning end position, without executing the first operation.

20 Claims, 11 Drawing Sheets

(56) References Cited

U.S. PATENT DOCUMENTS

| | | | | |
|---|---|---|---|---|
| 2007/0153325 A1* | 7/2007 | Mizumukai | ........ | H04N 1/00572 |
| | | | | 358/1.15 |
| 2007/0153339 A1* | 7/2007 | Itoh | .................... | H04N 1/00068 |
| | | | | 358/498 |
| 2009/0296172 A1* | 12/2009 | Iwatsuka | .................. | H04N 1/40 |
| | | | | 358/509 |
| 2010/0149603 A1* | 6/2010 | Maeda | ............... | H04N 1/00681 |
| | | | | 358/449 |
| 2016/0150109 A1* | 5/2016 | Matsui | ............... | H04N 1/00708 |
| | | | | 358/1.13 |
| 2017/0279979 A1* | 9/2017 | Maeda | ............... | H04N 1/00551 |

FOREIGN PATENT DOCUMENTS

| JP | 2012-049678 A | 3/2012 |
|---|---|---|
| JP | 2016-051977 A | 4/2016 |

\* cited by examiner

IMAGE SCANNING APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-073324 filed on Apr. 1, 2017. The entire subject matter of the application is incorporated herein by reference.

BACKGROUND

Technical Field

Aspects of the present disclosure are related to an image scanning apparatus, and a method and a non-transitory computer-readable medium therefor.

Related Art

Heretofore, a flatbed type image scanning apparatus has been known. The known apparatus includes a document table having a glass plate, a document cover, a carriage, and a CIS unit ("CIS" is an abbreviation of "Contact Image Sensor") mounted on the carriage. The document cover is openable and closable relative to the document table. The carriage is configured to reciprocate along a particular direction under the document table.

The user opens the document cover, sets the document sheet on the document table, and closes the document cover to press the document cover against the document table and cover the document table. Thereby, the document sheet is brought in close contact with the document table. Further, this configuration may eliminate or reduce external light reaching the CIS unit. Meanwhile, in response to the document cover being opened, the image scanning apparatus controls the carriage to move from a predetermined home position to a scanning start position. In response to receipt of an instruction to start image scanning after the document cover is closed, the image scanning apparatus performs image scanning of the document sheet by the CIS unit while moving the carriage at a constant speed in the particular direction from the scanning start position to a scanning end position.

When the carriage reaches the scanning end position, and the image scanning of the document sheet by the CIS unit is completed, the image scanning apparatus controls the carriage to return to a standby position from the scanning end position. Afterwards, the image scanning apparatus moves the carriage from the standby position toward the scanning start position, to scan a black-white pattern by the CIS unit. Then, the image scanning apparatus determines whether a moving distance of the carriage in the particular direction from when the carriage started moving from the standby position until the CIS unit has scanned the black-white pattern is substantially identical to a distance in the particular direction between the predetermined home position and the black-white pattern. If determining that the moving distance of the carriage is substantially identical to the distance between the predetermined home position and the black-white pattern, the image scanning apparatus may determine that the carriage has returned to the predetermined home position exactly.

SUMMARY

If the image scanning apparatus does not determine that the carriage has returned to the predetermined home position exactly, the image scanning apparatus may correct itself such that the carriage returns to the predetermined home position exactly. Thereby, it enables the carriage to start moving from the scanning start position. However, determining whether the image scanning apparatus returns to the predetermined home position exactly each time the carriage returns to the standby position may result in a longer interval between an end of previous image scanning and a start of next image scanning.

According to aspects of the present disclosure, an image scanning apparatus is provided, which includes a document table, a cover movable between an open position where the cover is open relative to the document table and a closed position where the cover is closed relative to the document table, a cover sensor configured to output a first signal when the cover is in the open position and output a second signal when the cover is in the closed position, an image scanner including a linear image sensor extending along a main scanning direction, the image scanner being configured to perform image scanning of a sheet placed on the document table while changing a scanning position of the image scanner along a sub scanning direction perpendicular to the main scanning direction, and a controller. The controller is configured to control the image scanner to perform image scanning while changing the scanning position from a scanning start position to a scanning end position in the sub scanning direction, after completion of the image scanning, control the image scanner to change the scanning position from the scanning end position toward the scanning start position, determine whether the first signal is output from the cover sensor while the image scanner is changing the scanning position from the scanning end position toward the scanning start position, and in response to determining that the first signal is not output from the cover sensor while the image scanner is changing the scanning position, execute a first operation of checking whether a standby position is coincident with a home position, the standby position being opposed to the scanning end position across the scanning start position in the sub scanning direction, and in response to determining that the first signal is output from the cover sensor while the image scanner is changing the scanning position, execute a second operation, the second operation including controlling the image scanner to change the scanning position to a particular position between the standby position and the scanning end position in the sub scanning direction, without executing the first operation.

According to aspects of the present disclosure, further provided is a method implementable on a processor coupled with an image scanning apparatus. The image scanning apparatus includes a document table, a cover movable between an open position where the cover is open relative to the document table and a closed position where the cover is closed relative to the document table, a cover sensor configured to output a first signal when the cover is in the open position and output a second signal when the cover is in the closed position, and an image scanner including a linear image sensor extending along a main scanning direction, the image scanner being configured to perform image scanning of a sheet placed on the document table while changing a scanning position of the image scanner along a sub scanning direction perpendicular to the main scanning direction. The method includes controlling the image scanner to perform image scanning while changing the scanning position from a scanning start position to a scanning end position in the sub scanning direction, after completion of the image scanning, controlling the image scanner to change the scanning position from the scanning end position toward the scanning start position, determining whether the first signal is output from the cover sensor while the image scanner is changing the scanning position from the scanning end position toward the scanning start position, and in response to determining that the first signal is not output from the cover sensor while the image scanner is changing the scanning position, executing a first operation of checking whether a standby position is coincident with a home position, the standby position being opposed to the scanning end position across the scanning start position in the sub scanning direction, and in response to determining that the first signal is output from the cover sensor while the image scanner is changing the scanning position, executing a second operation, the second operation including controlling the image scanner to change the scanning position to a particular position between the standby position and the scanning end position in the sub scanning direction, without executing the first operation.

According to aspects of the present disclosure, further provided is a non-transitory computer-readable medium storing computer-readable instructions that are executable by a processor coupled with an image scanning apparatus. The image scanning apparatus includes a document table, a cover movable between an open position where the cover is open relative to the document table and a closed position where the cover is closed relative to the document table, a cover sensor configured to output a first signal when the cover is in the open position and output a second signal when the cover is in the closed position, and an image scanner including a linear image sensor extending along a main scanning direction, the image scanner being configured to perform image scanning of a sheet placed on the document table while changing a scanning position of the image scanner along a sub scanning direction perpendicular to the main scanning direction. The instructions are configured to, when executed by the processor, cause the processor to control the image scanner to perform image scanning while changing the scanning position from a scanning start position to a scanning end position in the sub scanning direction, after completion of the image scanning, control the image scanner to change the scanning position from the scanning end position toward the scanning start position, determine whether the first signal is output from the cover sensor while the image scanner is changing the scanning position from the scanning end position toward the scanning start position, and in response to determining that the first signal is not output from the cover sensor while the image scanner is changing the scanning position, execute a first operation of checking whether a standby position is coincident with a home position, the standby position being opposed to the scanning end position across the scanning start position in the sub scanning direction, and in response to determining that the first signal is output from the cover sensor while the image scanner is changing the scanning position, execute a second operation, the second operation including controlling the image scanner to change the scanning position to a particular position between the standby position and the scanning end position in the sub scanning direction, without executing the first operation.

BRIEF DESCRIPTION OF THE ACCOMPANYING DRAWINGS

Figure 5:
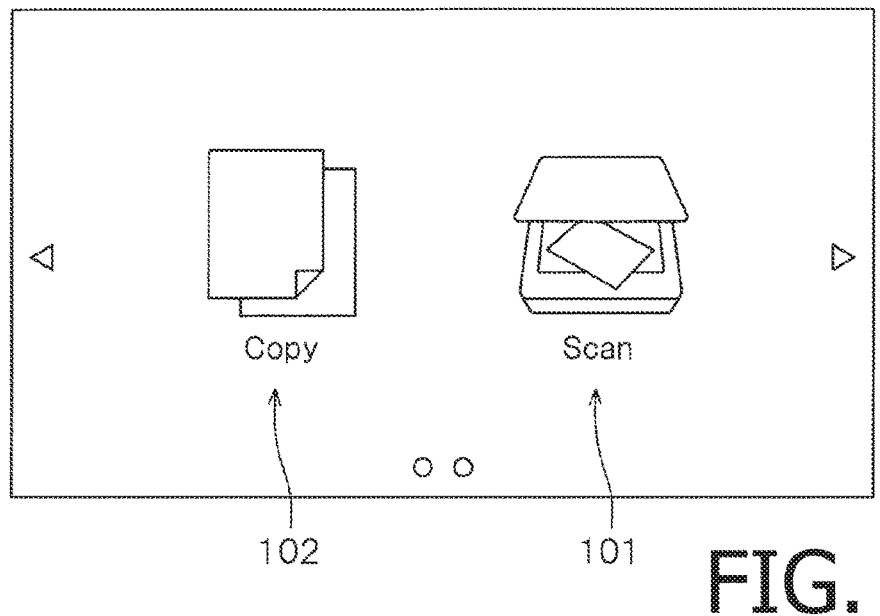

FIG. 5 exemplifies a standby screen displayed on a display of the image scanning apparatus in the illustrative embodiment according to one or more aspects of the present disclosure.

Figure 6:
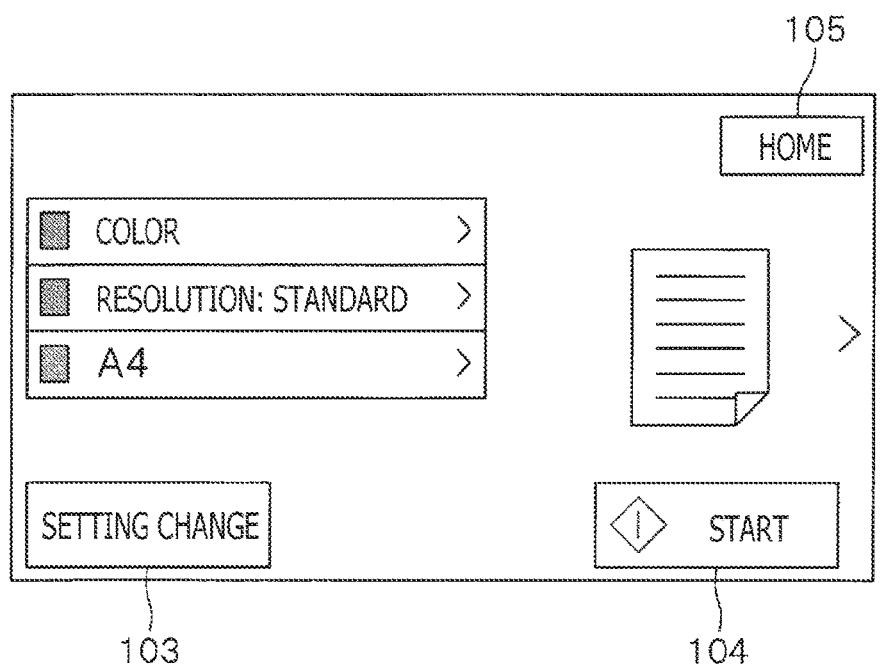

FIG. 6 exemplifies a scanning start screen displayed on the display of the image scanning apparatus in the illustrative embodiment according to one or more aspects of the present disclosure.

Figure 7A:
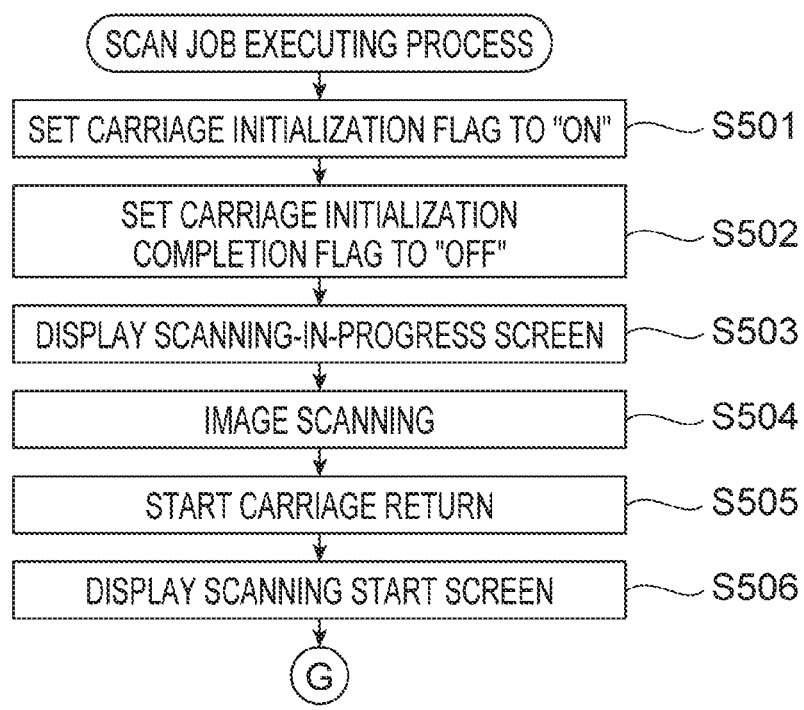
Figure 7B:
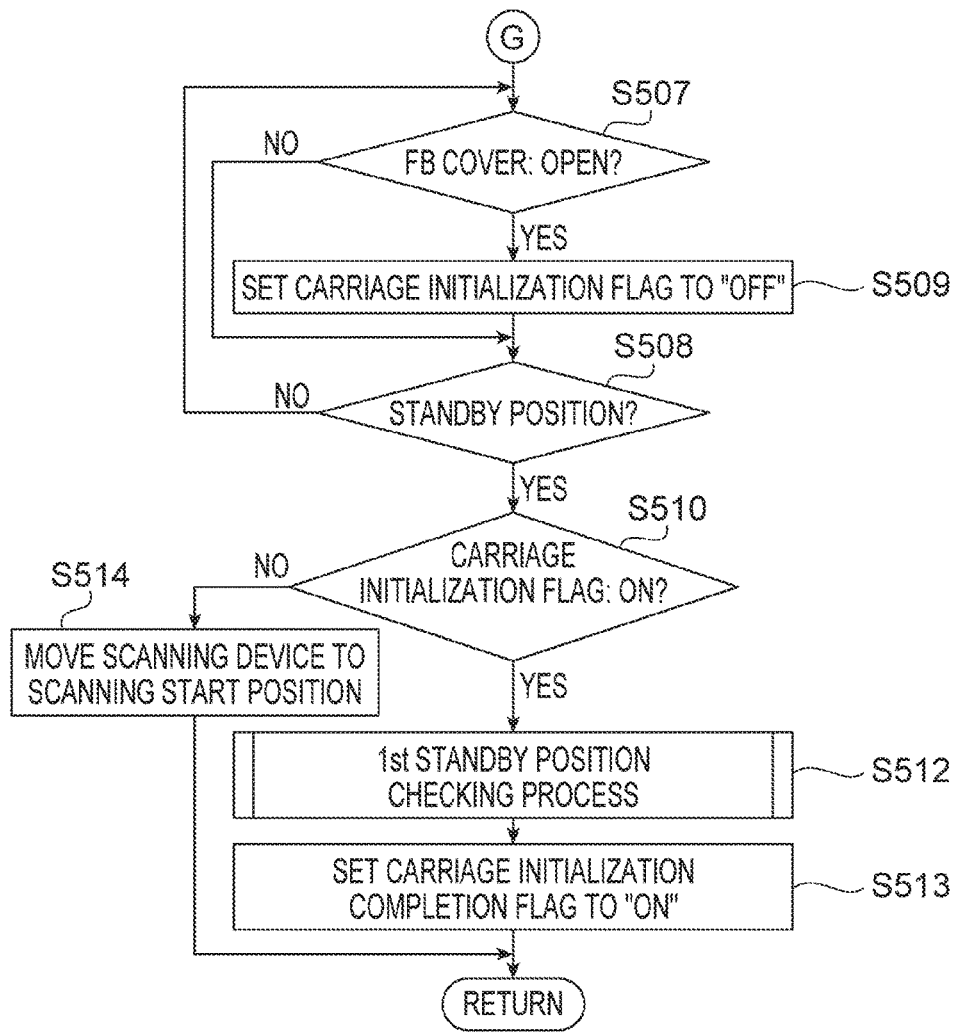

FIGS. 7A and 7B are flowcharts showing a procedure of a scan job executing process to be executed by the image scanning apparatus in the illustrative embodiment according to one or more aspects of the present disclosure.

Figure 8:
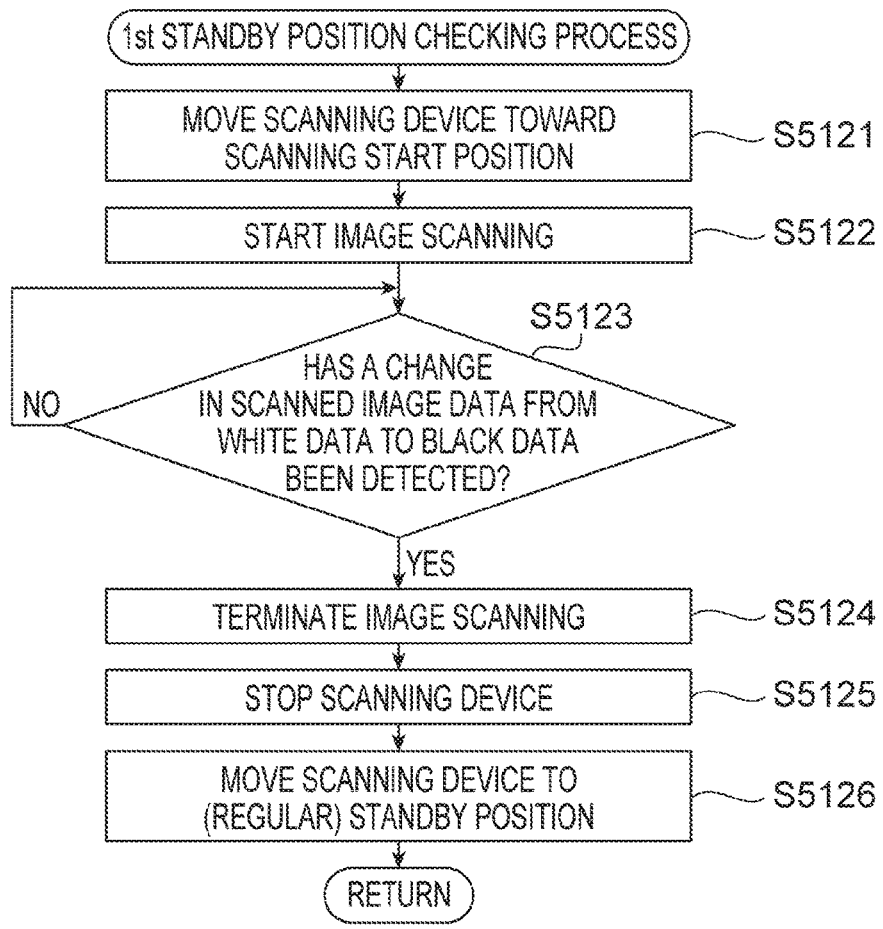

FIG. 8 is a flowchart showing a procedure of a first standby position checking process to be executed by the image scanning apparatus in the illustrative embodiment according to one or more aspects of the present disclosure.

Figure 9:
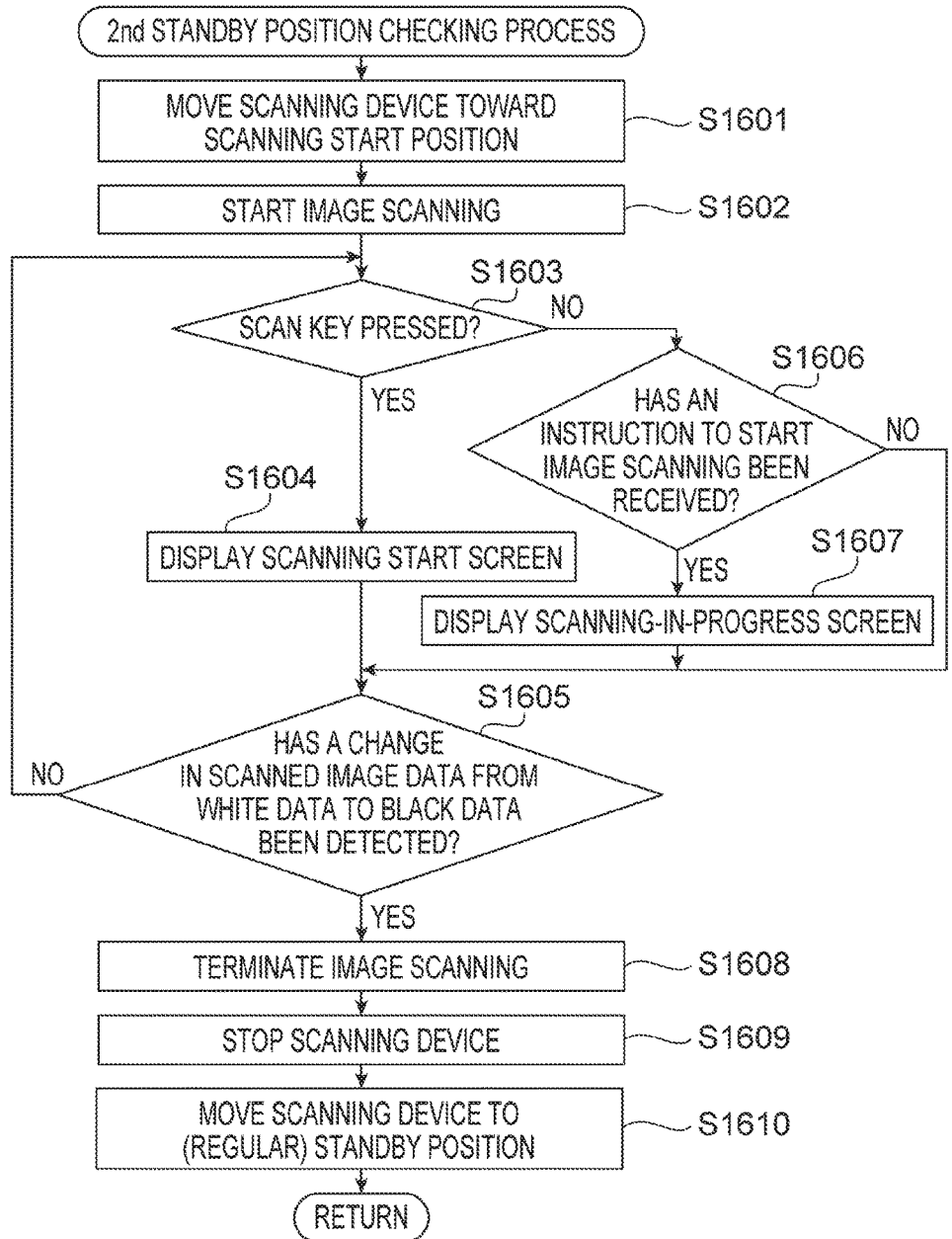

FIG. 9 is a flowchart showing a procedure of a second standby position checking process to be executed by the image scanning apparatus in the illustrative embodiment according to one or more aspects of the present disclosure.

Figure 10:
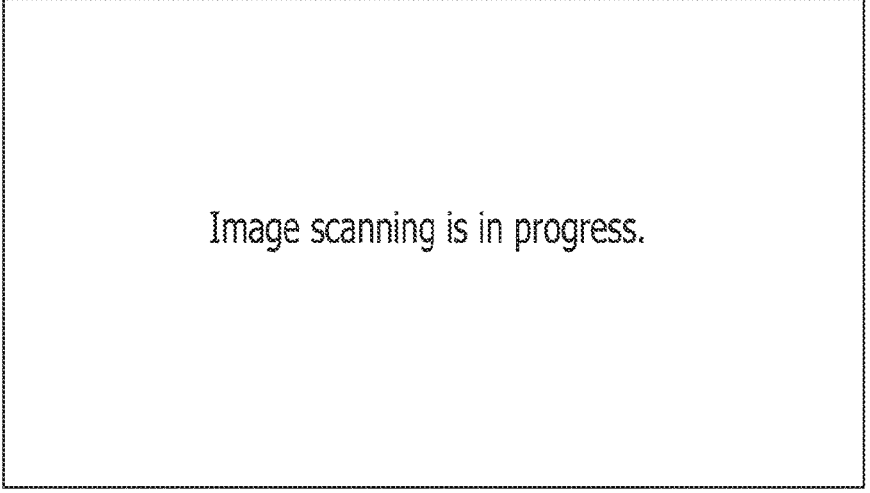

FIG. 10 exemplifies a scanning-in-progress screen displayed on the display of the image scanning apparatus in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an image scanning apparatus 1 of an illustrative embodiment according to aspects of the present disclosure will be described with reference to the accompanying drawings. In the following description, a left-to-right direction, a front-to-rear direction, and a vertical direction of the apparatus 1 may be defined as shown in FIGS. 1 and 2.

<Mechanical Configuration of Image Scanning Apparatus>

Figure 1:
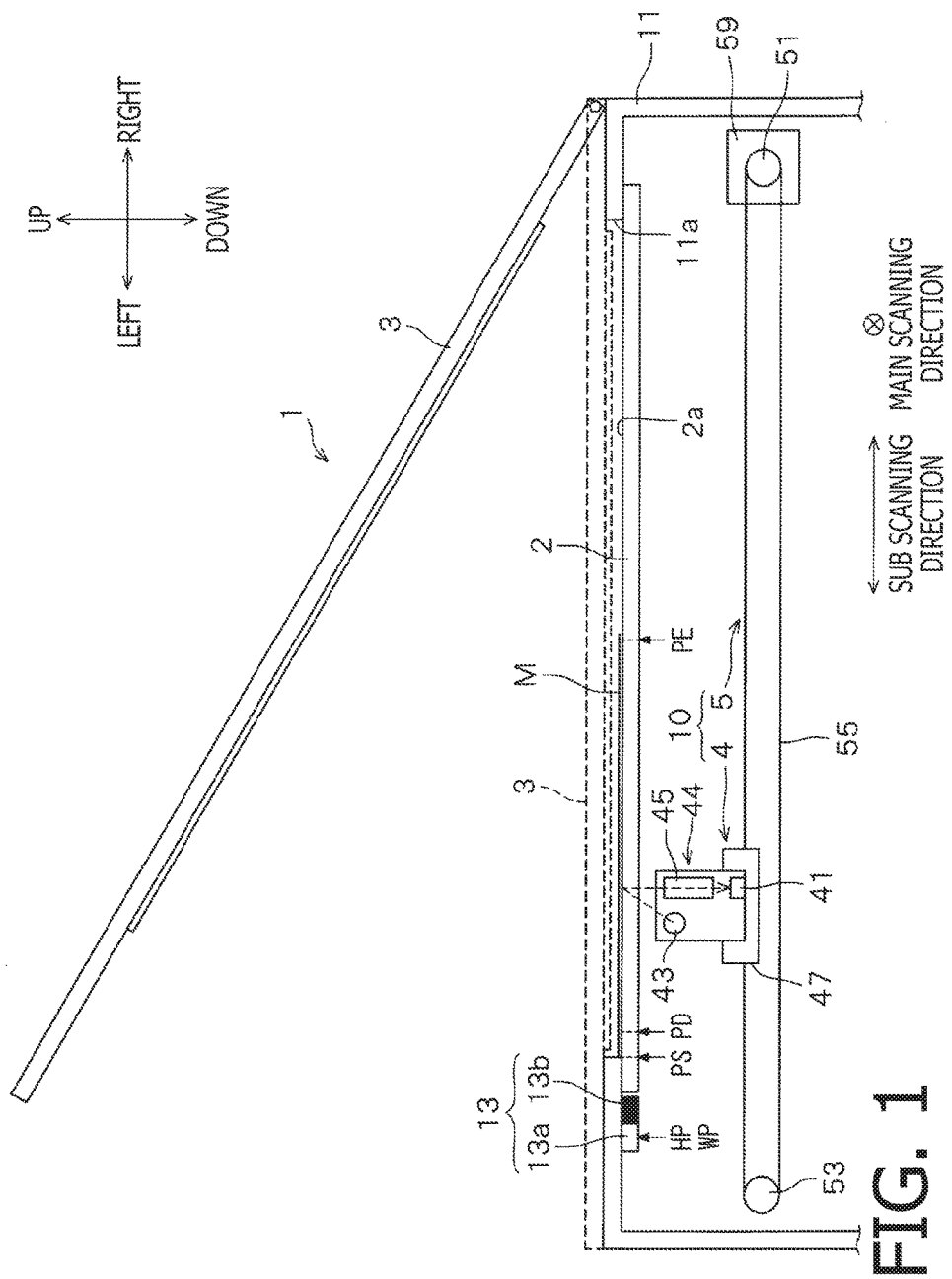
FIG. 1 is a cross-sectional front view schematically showing a configuration of an image scanning apparatus in an illustrative embodiment according to one or more aspects of the present disclosure.
Figure 2:
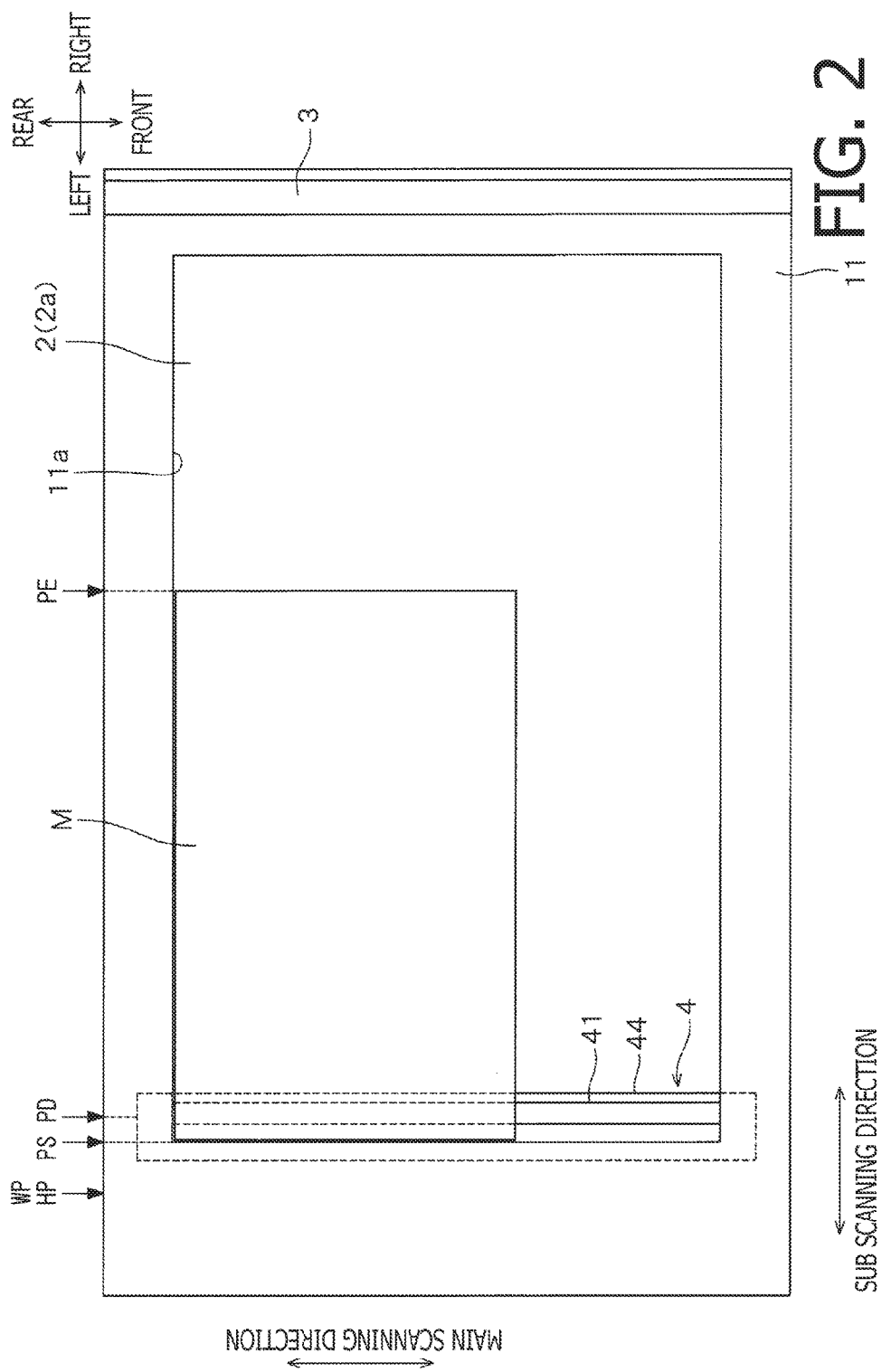
FIG. 2 is a plane view schematically showing the image scanning apparatus when an FB cover is open, in the illustrative embodiment according to one or more aspects of the present disclosure.

As shown in FIG. 1, the image scanning apparatus 1 includes a platen glass 2, an FB cover 3, and an image scanner 10. The image scanner 10 includes a scanning device 4 and a moving mechanism 5.

The platen glass 2 closes, from an inside of the housing 11, an opening 11a formed in an upper portion of a housing 11 of the image scanning apparatus 1. The housing 11 is formed substantially in a rectangular parallelepiped shape. A portion, exposed through the opening 11a, of an upper surface of the platen glass 2 constitutes a document placement surface 2a on which a document sheet M to be scanned is placed.

An end portion of the FB cover 3 is rotatably supported by an upper surface portion of the housing 11. Thereby, the FB cover 3 is swingable between an open position and a closed position (indicated by a dashed line in FIG. 1). When the FB cover 3 is in the open position, the document placement surface 2a is exposed outside.

For instance, as indicated by a solid line in FIG. 1, the open position of the FB cover 3 is not limited to a fully-opened position but may be a position where the FB cover 3 is opened at a particular angle or more from the closed position. FIG. 2 is a plane view of the image scanning apparatus 1 when the FB cover 3 is in the fully-opened position (in which the FB cover 3 may be substantially perpendicular to the document placement surface 2a). FIG. 2 schematically shows a position of the scanning device 4. It is noted that FIG. 2 does not show some (e.g., the moving mechanism 5) of the major elements included in the image scanning apparatus 1 for the sake of explanatory simplicity.

As shown in FIG. 1, the scanning device 4 and the moving mechanism 5 are disposed inside the housing 11. The scanning device 4 includes a CIS ("CIS" is an abbreviation of "Contact Image Sensor") 44 and a carriage 47. The CIS 44 includes an image sensor 41, a light source 43, and a rod lens array 45. The CIS 44 is mounted on the carriage 47. The image sensor 41 is a linear image sensor having a plurality of light receiving elements (not shown) arranged along a main scanning direction. The light source 43 includes one or more light-emitting diodes. The light source 43 is configured to emit light toward the platen glass 2. The rod lens array 45 is configured to image, on each light receiving element, reflected light from an object irradiated with the light emitted by the light source 43. A position where the reflected light from the irradiated object is imaged on each light receiving element is a scanning position. Thereby, the scanning device 4 scans a single line of an image of the irradiated object.

The moving mechanism 5 is configured to move the scanning device 4 along a sub scanning direction (i.e., the left-to-right direction) perpendicular to the main scanning direction. The moving mechanism 5 includes a driving pulley 51, a driven pulley 53, and an endless belt 55. The driving pulley 51 is driven by a motor 59 configured to rotate in forward and backward directions. The endless belt 55 is wound around a pair of the driving pulley 51 and the driven pulley 53. The driving pulley 51 is disposed at an end portion in the sub scanning direction inside the housing 11. The driven pulley 53 is disposed at another end portion in the sub scanning direction inside the housing 11. The carriage 47 is attached to the belt 55. The belt moves in response to rotation of the driving pulley 51. Along with the movement of the belt 55, the carriage moves along the sub scanning direction.

An adjustment reference plate 13 is disposed on the left of the platen glass 2. The adjustment reference plate 13 includes a white tape 13a and a black tape 13b. The white tape 13a and the black tape 13b are arranged along the sub scanning direction. A home position HP of the scanning device 4 is located a particular distance leftward away from a boundary between the white tape 13a and the black tape 13b.

A stating point and an ending point of the movement of the scanning device 4 will be described. As the starting point or the ending point of the movement of the scanning device 4, a standby position WP, a scanning start position PS, a scanning end position PE, and a document detecting position PD are set.

The standby position WP is a reference position for the scanning device 4. When the standby position WP (e.g., a provisional position identified as the standby position WP) is not displaced from its regular position, the standby position WP is coincident with the home position HP.

It is noted that, in the present disclosure, a position of the scanning device 4 may represent the scanning position where the scanning device 4 performs image scanning. For instance, when the scanning device 4 is in the standby position WP, it denotes that the scanning position of the scanning device 4 is coincident with the standby position WP. Further, specifically, the scanning position represents a position where reflected light from an object irradiated with light emitted by the light source 43 is imaged on the image sensor 41. In other words, the scanning position is defined by a position of the rod lens array 45, and is in a conjugate relation with a position of the image sensor 41, in the sub scanning direction.

For instance, the scanning start position is set to a left end position of the document placement surface 2a. In this regard, in order to prevent the scanning device 4 from scanning the housing 11, the scanning start position PS may be set to a position that is rightward away from the left end position of the document placement surface 2a.

The scanning end position PE is set depending on a size of a document sheet to be scanned. The scanning end position PE is set to a position that is rightward away from the scanning start position PS by a distance corresponding to a width of the document sheet M in the sub scanning direction.

<Electrical Configuration of Image Scanning Apparatus>

Figure 3:
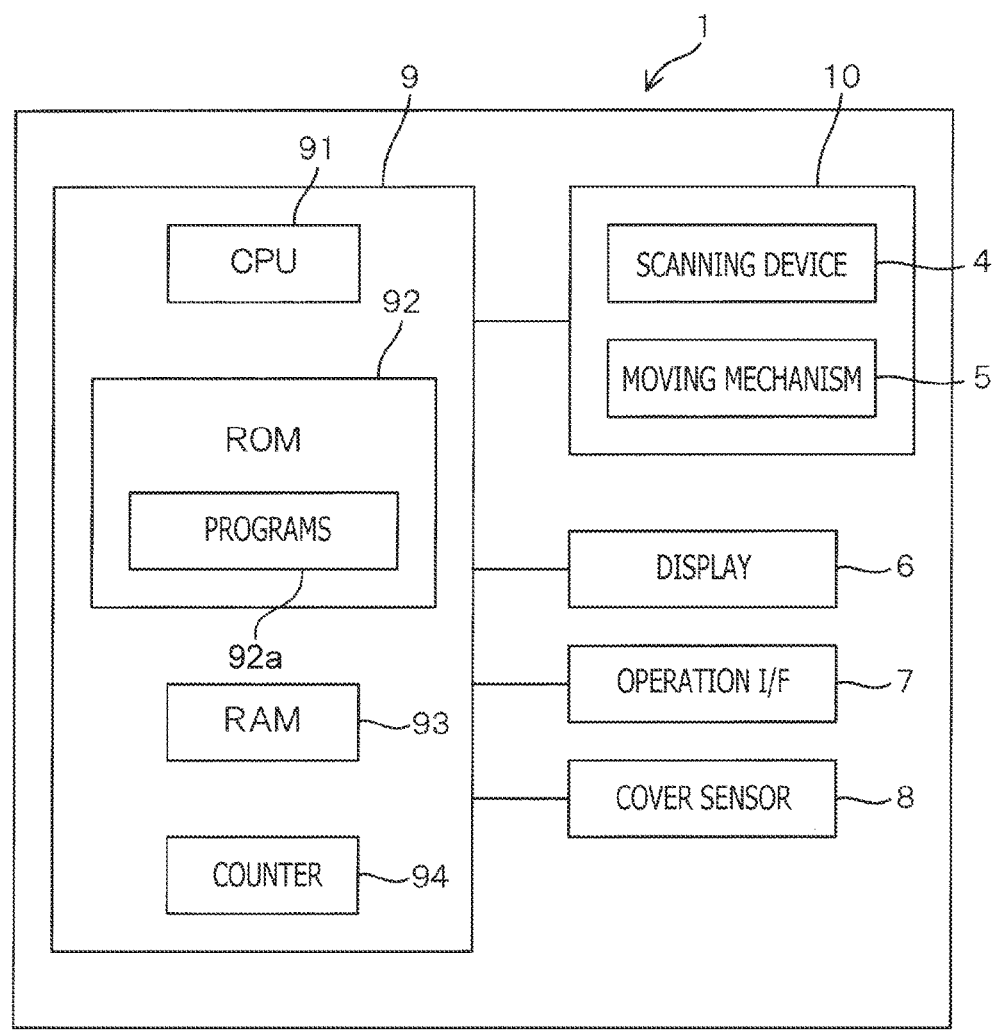
FIG. 3 is a block diagram schematically showing an electrical configuration of the image scanning apparatus in the illustrative embodiment according to one or more aspects of the present disclosure.

As shown in FIG. 3, the image scanning apparatus 1 includes a controller 9. The controller 9 includes a CPU 91, a ROM 92, a RAM 93, and a counter 94. The controller 9 is connected with the scanning device 4 and the moving mechanism 5 of the image scanner 10. Further, the controller 9 is connected with a display 9, an operation I/F ("I/F" is an abbreviation of "interface") 7, and a cover sensor 8.

The CPU 91 is configured to execute programs 92a stored in the ROM 92, thereby controlling elements included in the image scanning apparatus 1.

Besides the programs 92a, the ROM 92 stores, as a table for regular document sizes, data indicating respective dimensions of a short side and a long side of each of the regular document sizes (e.g., A3, A4, A5, and A6 sizes). Specifically, for instance, the ROM 92 may store, as a single table, data indicating 210 mm and 297 mm as respective dimensions of the short side and the long side of an A4-size document sheet, as well as data indicating respective dimensions of the short side and the long side of each of the other regular document sizes such as A3, A5, and A6 sizes.

The RAM 93 is used as a work area into which one or more programs 92a are loaded. Further, the RAM 93 is used as a storage area to temporarily store calculation results calculated in processes by the CPU 91 and image data scanned by the scanning device 4.

The motor 59 included in the moving mechanism 5 is a stepping motor. The counter 94 is configured to increment the number of driven steps by one each time the motor 59 is driven by one step. The CPU 91 controls the motor 59 to rotate in accordance with the number of driven steps counted by the counter 94. The motor 59 is rotatable in the forward direction and the backward direction. The CPU 91 controls the motor 59 to rotate in a specific one of the forward and backward directions and stop. The ROM 92 stores the number of driven steps of the motor 59 that is necessary for moving the scanning device 4 from the home position HP to the scanning start position PS. Further, the ROM 92 stores the number of driven steps of the motor 59 that is necessary for moving the scanning device 4 from the home position HP to the document detecting position PD.

For instance, the display 6 includes an LCD device or an organic EL display device. The display 6 is configured to display thereon various kinds of information.

The operation I/F 14 includes operable buttons (e.g., a start key, a numeric keypad, cursor keys, and a back button). By operating the operable buttons, the user may input various instructions via the operation I/F 14.

The operation I/F 14 may include touch keys integrally provided to the display 6. The display 6 and the operation I/F 7 may be integrated as a touch panel having both functions of the display 6 and the operation I/F 7.

The cover sensor 8 is configured to, when the FB cover is in the closed position, output an ON signal. Further, the cover sensor 8 is configured to, when the FB cover is in the open position, output an OFF signal. For instance, the cover sensor 8 may include a mechanical switch configured to be set to "ON" as an actuator is pressed by the FB cover 3 in a closed state where the FB cover 3 is in the closed position, and to be set to "OFF" as the actuator is not pressed by the FB cover 3 in an open state where the FB cover 3 is in the open position.

<Main Process>

Figure 4A:
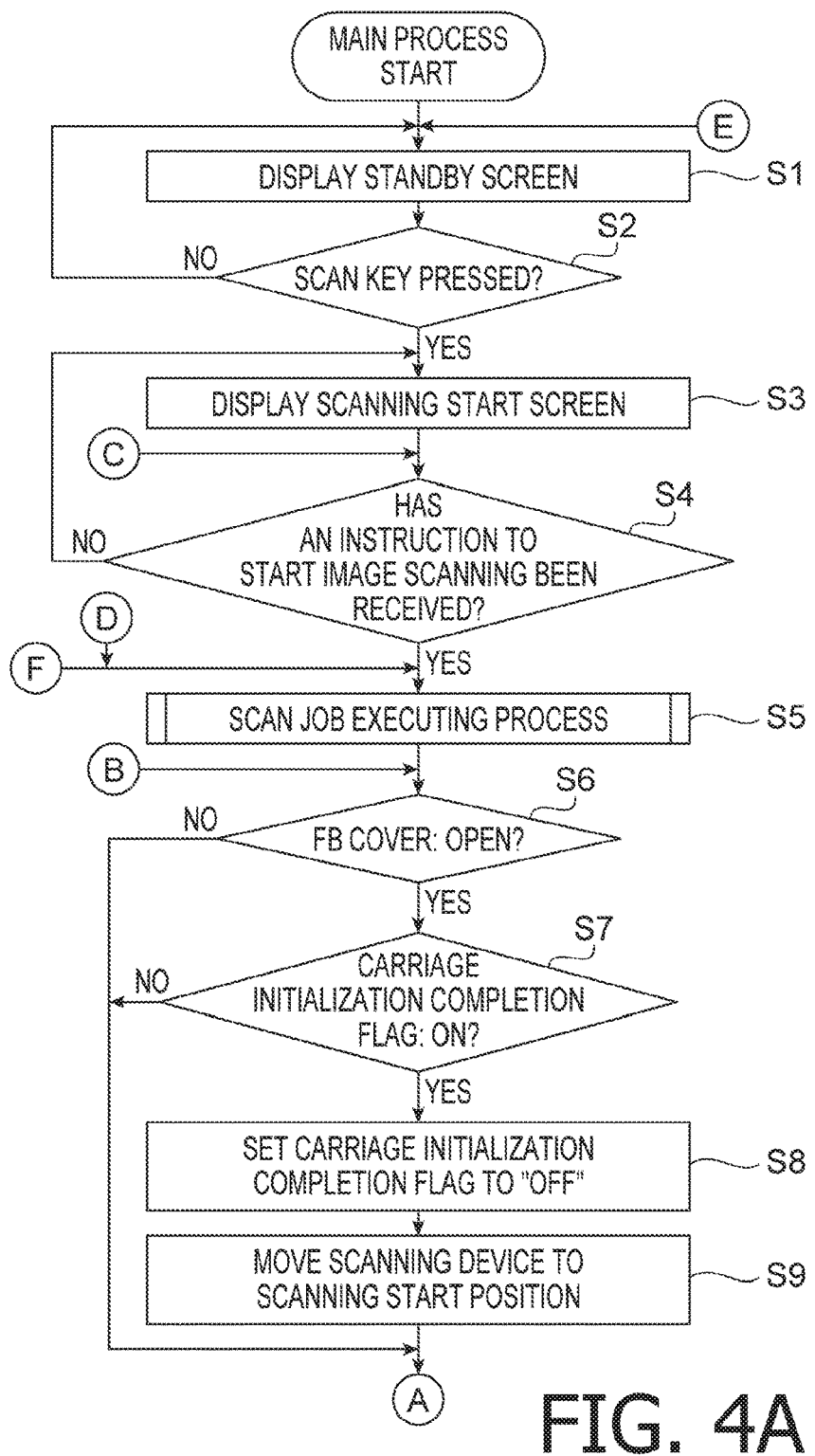
FIGS. 4A and 4B are flowcharts showing a procedure of a main process to be executed by the image scanning apparatus in the illustrative embodiment according to one or more aspects of the present disclosure.
Figure 4B:
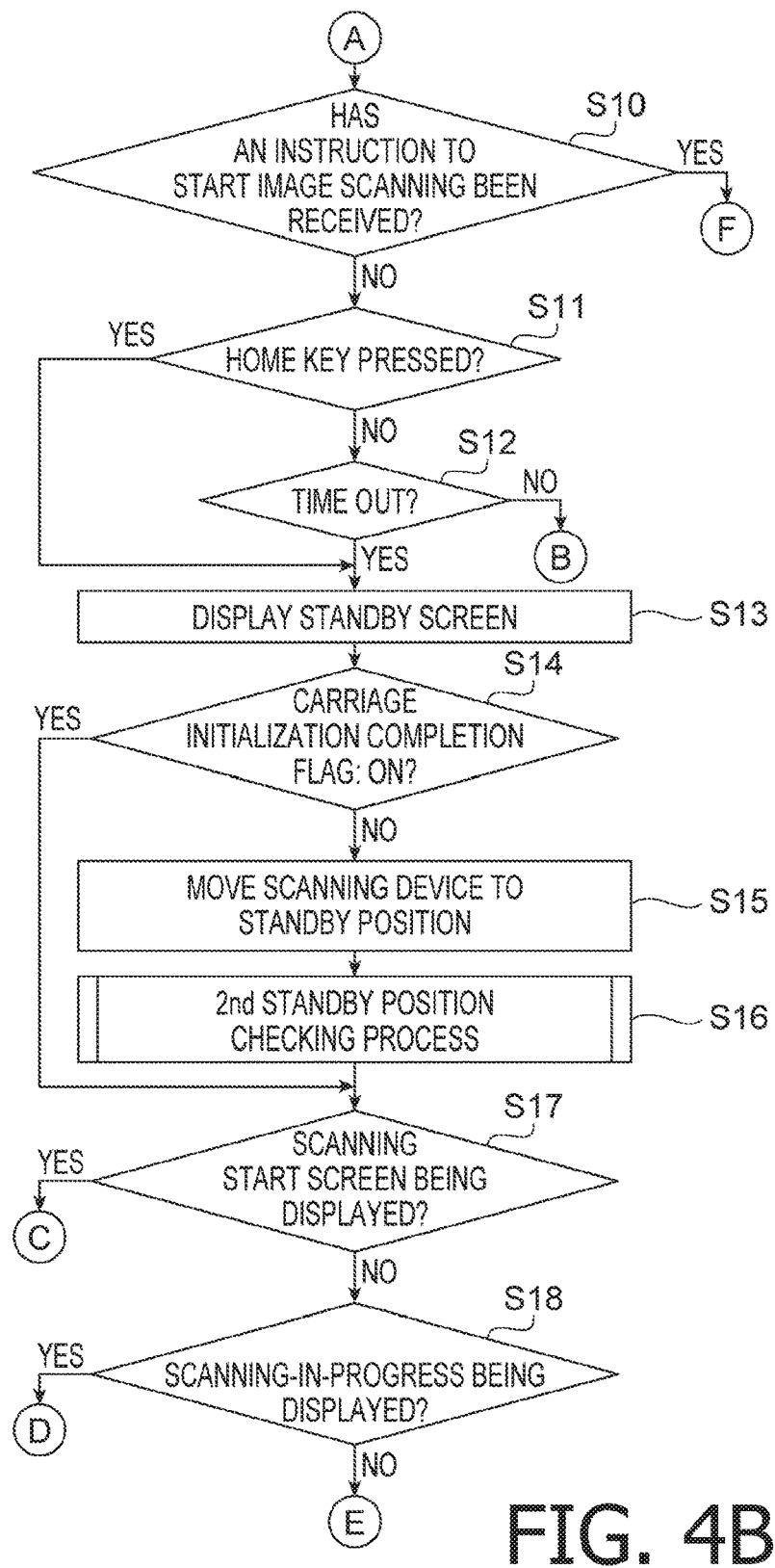

When the image scanning apparatus 1 is powered on, the CPU 91 of the controller 9 performs a main process shown in FIGS. 4A and 4B. The main process may be performed by the CPU 91 executing one or more programs 92a stored in the ROM 92.

In the main process, the CPU 91 controls the display 6 to display a standby screen thereon (S1).

FIG. 5 shows an example of the standby screen. The standby screen shown in FIG. 5 is an exemplary standby screen displayed when the image scanning apparatus 1 is used in combination with an image forming apparatus (e.g., a printer) having a printing function to form an image on a sheet. On the standby screen exemplified in FIG. 5, a scan key 101 and a copy key 102 are displayed horizontally side by side. The scan key 101 is for selecting a scanning function to scan an image of the document sheet M by the image scanning apparatus 1. The copy key is for selecting a copy function to form on a sheet a copied image of the document sheet M by using both the scanning function of the image scanning apparatus 1 and the printing function of the image forming apparatus. By pressing the scan key 101, the user is allowed to input a selection of the scanning function into the controller 9. Further, by pressing the copy key 102, the user is allowed to input a selection of the copy function into the controller 9.

The scan key 101 and the copy key 102 may be pressed (selected) via the operation I/F 7. When the display 6 and the operation I/F 7 are integrated as a touch panel, the scan key 101 and the copy key 102 may be pressed (selected) by touching the standby screen. The same applies to below-mentioned keys such as a setting change key 103, a start key 104, and a home key 105.

Further, in response to the image scanning apparatus 1 being powered on, the CPU 91 moves the scanning device 4 (mounted on the carriage 47) to the standby position WP.

After causing the display 6 to show the standby screen, the CPU 91 determines whether the scan key 101 has been pressed (S2). The CPU 91 keeps waiting without proceeding to a next step (i.e., S3) until the scan key 101 is pressed (S2: No). If the copy key 102 is pressed, a different process is started.

When the scan key 101 is pressed (S2: Yes), the CPU 91 controls the display 6 to display a scanning start screen (S3). Thereby, the screen displayed on the display 6 is switched from the standby screen to the scanning start screen.

FIG. 6 shows an example of the scanning start screen. On the scanning start screen exemplified in FIG. 6, setting information (e.g., a scanning mode, a scanning resolution, and a document size) regarding image scanning using the scanning function is displayed. As the scanning mode, for instance, one of a color mode, a grayscale mode, and a black-white mode may be set. As the scanning resolution, one of three levels of resolutions may be set. The three levels of resolutions include a low resolution (e.g., 150 dpi), a standard resolution (e.g., 300 dpi), and a high resolution (e.g., 600 dpi). As the document size, one of the regular document sizes (e.g., A3, A4, A5, and A6) or a user-set size (mm) may be set. When the document size is set, the CPU 91 determines document widths in the main scanning direction and the sub scanning direction with reference to the table of the regular document sizes stored in the ROM 92. The CPU 91 sets, as the scanning end position PE, a position that is located the document width rightward away from the scanning start position PS in the sub scanning direction. Further, on the scanning start screen, for instance, the setting change key 103 and the start key 104 are displayed horizontally side by side at a lower end portion of the scanning start screen. In response to the setting change key 103 being pressed, the scanning start screen is switched to a screen for changing settings for image scanning in response to the start key 104 being pressed, an instruction to start image scanning of the document sheet M is input into the controller 9. Further, the home key 105 is displayed on the scanning start screen. In response to the home key 105 being pressed, an instruction to switch the screen displayed on the display 6 from the scanning start screen to the standby screen is input into the controller 9.

After causing the display 6 to show the scanning start screen, the CPU 91 determines whether the CPU 91 has received an instruction to start image scanning in response to the start key 104 being pressed (S4). The CPU 91 keeps waiting without proceeding to a next step (i.e., S5) until the start key 104 is pressed (S4: No).

When receiving an instruction to start image scanning in response to the start key 104 being pressed (S4: Yes), the CPU 91 performs a scan job executing process shown in FIGS. 7A and 7B (S5).

<Scan Job Executing Process>

In the scan job executing process, the CPU 91 sets a carriage initialization flag stored in the RAM 93 to "ON" (S501). The carriage initialization flag set to "ON" represents that the standby position WP needs to be adjusted (initialized) to its regular position by execution of a first standby position checking process.

Further, the CPU 91 sets a carriage initialization completion flag stored in the RAM 93 to "OFF" (S502). The carriage initialization completion flag set to "OFF" represents that the standby position WP is not adjusted (initialized) to its regular position by execution of the first standby position checking process.

Further, the CPU 91 controls the display 6 to display a scanning-in-progress screen (S503). Thereby, the screen displayed on the display 6 is switched from the scanning start screen to the scanning-in-progress screen. For instance, as shown in FIG. 10, the scanning-in-progress screen may include a message representing that image scanning is in execution.

Then, the CPU 91 performs a scanning process (S504). In the scanning process, the CPU 91 controls the scanning device 4 to scan an image of the document sheet M placed on the document placement surface 2a while moving the scanning device 4 in a forward direction from the scanning start position PS toward the scanning end position PE.

In the scanning process, the CPU 91 controls the motor 59 included in the moving mechanism 5, thereby beginning to move the scanning device 4, which is stopping at the scanning start position PS, in the forward direction along the sub scanning direction. Afterwards, the CPU 91 turns on the light source 43 of the scanning device 4 and starts image scanning by the scanning device 4. When the motor 59 has rotated by the number of steps necessary for the scanning device 4 to reach the scanning end position PE, the CPU 91 terminates the image scanning, and stores image data scanned by the scanning device 4 into the RAM 93. Then, the CPU 91 turns off the light source 43, stops the movement of the scanning device 4, and terminates the scanning process. It is noted that the image data stored in the RAM 93 may be transmitted to an external device (e.g., a PC) via a communication I/F (e.g., a LAN and a USB) not shown in any drawing. In this case, after completion of image scanning of a whole area of the document sheet M, the image data stored in the RAM 93 may be transmitted. Alternatively, each time a single line of image data of the document sheet M has been scanned, the single line of scanned image data may be transmitted in sequence to the external device.

At the end of the scanning process, the scanning device 4 is in the scanning end position PE. The CPU 91 controls the motor 59 included in the moving mechanism 5, thereby beginning to move the scanning device 4 (the carriage 47) in a backward direction along the sub scanning direction (S505).

Further, the CPU 91 controls the display 6 to display the scanning start screen (S506).

Then, the CPU 91 determines whether the FB cover 3 is open, based on a detection signal from the cover sensor 8 (S507).

The CPU 91 determines whether the motor 59 has rotated by the number of steps necessary for the scanning device 4 to move from the scanning end position PE to the standby position WP (S508). When determining that the motor 59 has not rotated by the number of steps necessary for the scanning device 4 to move from the scanning end position PE to the standby position WP (S508: No), the CPU 91 goes back to S507. Thus, when the scanning device 4 does not reach the standby position WP, the CPU 91 repeatedly determines in S507 whether the FB cover 3 is open, until the scanning device 4 reaches the standby position WP.

When the FB cover 3 is opened before the scanning device 4 reaches the standby position WP (S507: Yes), the CPU 91 sets the carriage initialization flag to "OFF" (S509).

When the scanning device 4 reaches the standby position WP (S508: Yes), the CPU 91 stops the scanning device 4 and determines whether the carriage initialization flag is "ON" (S510).

When determining that the carriage initialization flag is "ON" (S510: Yes), the CPU 91 performs the first standby position checking process (S512). The first standby position checking process will be described later.

After completion of the first standby position checking process, the CPU 91 sets the carriage initialization completion flag to "ON." Afterwards, the CPU 91 returns to the main process.

Meanwhile, when the carriage initialization flag is "OFF" at a point of time when the scanning device 4 reaches the standby position WP (S510: No), the CPU 91 moves the scanning device 4 to the scanning start position PS (S514). Afterwards, the CPU 91 returns to the main process.

<Subsequent Procedure of Main Process>

After completion of the scan job executing process (S5), the CPU 91 determines whether the FB cover 3 is in the open state, based on a detection signal from the cover sensor 8 (S6).

When determining that the FB cover 3 is in the open state (S6: Yes), the CPU 91 determines whether the carriage initialization flag is "ON" (S7).

When the carriage initialization completion flag is "ON" (S7: Yes), it denotes that the first standby position checking process has been performed in the scan job executing process. In this case, the CPU 91 sets the carriage initialization completion flag to "OFF" (S8).

After setting the carriage initialization completion flag to "OFF," the CPU 91 controls the motor 59 included in the moving mechanism 5, thereby moving the scanning device 4 from the standby position WP to the scanning start position PS (S9).

Thereafter, the CPU 91 determines whether the CPU 91 has received an instruction to start image scanning in response to the start key 104 being pressed on the scanning start screen (S10).

Meanwhile, after completion of the scan job executing process (S5), when the FB cover 3 is in the closed state (S6: No), it denotes that the FB cover 3 was once opened after image scanning of the document sheet M in the scanning process, and thereafter the FB cover 3 has been closed by the time the scanning device 4 returns to the standby position WP, or that the FB cover 3 has never been opened after image scanning of the document sheet M in the scanning process. In this case, the CPU 91 goes to S10 without executing any of the steps S7 to S9, and determines whether the CPU 91 has received an instruction to start image scanning in response to the start key 104 being pressed on the scanning start screen (S10).

Further, after completion of the scan job executing process (S5), when the FB cover 3 is in the open state (S6: Yes), and the carriage initialization completion flag is "OFF" (S7: No), it denotes that the FB cover 3 has been opened by the time the scanning device 4 returns to the standby position WP after image scanning of the document sheet M in the scanning process and that the FB cover 3 is still open even after the scanning device 4 has returned to the standby position WP. In this case, the CPU 91 goes to S10 without executing S8 or S9, and determines whether the CPU 91 has received an instruction to start image scanning in response to the start key 104 being pressed on the scanning start screen (S10).

When having not received an instruction to start image scanning (S10: No), the CPU 91 determines whether the home key 105 has been pressed on the scanning start screen (S11).

When determining that the home key 105 has not been pressed on the scanning start screen (S11: No), the CPU 91 determines whether a particular period of time has elapsed (time-out) without receipt of an instruction to start image scanning or pressing of the home key 105 (S12).

When determining that the particular period of time has not elapsed without receipt of an instruction to start image scanning or pressing of the home key 105 (S12: No), the CPU 91 goes back to S6, and again determines whether the FB cover 3 is in the open state, based on a detection signal from the cover sensor 8 (S6).

When the start key 104 is pressed before lapse of the particular period of time (S10: Yes), the CPU 91 again performs the scan job executing process in response to receipt of an instruction to start image scanning (S5).

When the home key 105 is pressed on the scanning start screen before lapse of the particular period of time (S11: Yes), or the particular period of time has elapsed without receipt of an instruction to start image scanning or pressing of the home key 105 (S12: Yes), the CPU 91 controls the display 6 to display the standby screen (S13). Thereby, the screen displayed on the display 6 is switched from the scanning start screen to the standby screen.

Afterwards, the CPU 91 determines whether the carriage initialization completion flag is "ON" (S14).

When the carriage initialization completion flag is "OFF" (S14: No), it denotes that the first standby position checking process has not been performed in the scan job executing process or that the FB cover 3 was opened after execution of the first standby position checking process. Therefore, when the carriage initialization completion flag is "OFF," the scanning device 4 is in the scanning start position PS. In this case, the CPU 91 controls the motor 59 included in the moving mechanism 5, thereby moving the scanning device 4 to the standby position WP (S15).

After moving the scanning device 4 to the standby position WP, the CPU 91 performs a second standby position checking process (S16). The second standby position checking process will be described later.

After completion of the second standby position checking process, the CPU 91 determines whether the scanning start screen is displayed on the display 6 (S17).

Meanwhile, when the carriage initialization completion flag is "ON" (S14: Yes), it denotes that the FB cover 3 has not been opened after execution of the first standby position checking process in the scan job executing process. In this case, the CPU 91 goes to S17 without executing S15 or S16, and determines whether the scanning start screen is being displayed on the display 6 (S17).

At this time, when the second standby position checking process is not in execution, the standby screen is displayed on the display 6. When determining that the scanning start screen is not being displayed on the display 6 (S17: No), the CPU 91 determines whether the scanning-in-progress screen is being displayed on the display 6 (S18).

When any of the scanning start screen and the scanning-in-progress screen is not being displayed on the display 6 (S17: No, and S18: No), i.e., when the standby screen is being displayed on the display 6, the CPU 91 goes back to S1, and continues to display the standby screen on the display 6 (S1). Then, the CPU 91 determines whether the scan key 101 has been pressed on the standby screen (S2).

When the scanning start screen is being displayed on the display 6 (S17: Yes), it denotes that the second standby position checking process was executed, and the scan key 101 has been pressed during execution of the second standby position checking process, whereas the start key 104 has not been pressed on the scanning start screen. In this case, the CPU 91 goes back to S4, and determines whether the CPU 91 has received an instruction to start image scanning in response to the start key 104 being pressed.

When the scanning-in-progress screen is being displayed on the display 6 (S18: Yes), it denotes that the second standby position checking process was executed, the scan key 101 was pressed during execution of the second standby position checking process, and the start key 104 has been pressed on the scanning start screen. In this case, the CPU 91 goes back to S5, and performs the scan job executing process.

<First Standby Position Checking Process>

In the first standby position checking process, the CPU 91 controls the motor 59 included in the moving mechanism 5, thereby moving the scanning device 4 from the standby position WP to the scanning start position PS (S5121).

Then, the CPU 91 controls the scanning device 4 to start image scanning (S5122).

Afterwards, in response to the scanning device 4 reading out the boundary between the white tape 13a and the black tape 13b of the adjustment reference plate 13, the CPU 91 detects a change in the scanned image data from white data to black data, that is, the CPU 91 confirms that a level of an output signal from the image sensor 41 has decreased from a value corresponding to the white tape 13a to a value corresponding to the black tape 13b) (S5123: Yes). Thereafter, the CPU 91 terminates the image scanning by the scanning device 4 (S5124).

Further, at a point of time when detecting the change from white pixels to black pixels, the CPU 91 controls the motor 59 included in the moving mechanism 5, thereby stopping the movement of the scanning device 4 (S5125).

Then, the CPU 91 moves the scanning device 4 leftward by the particular distance between the home position HP and the boundary between the white tape 13a and the black tape 13b, thereby moving the scanning device 4 to the regular standby position WP (S5126). Thereafter, the CPU 91 terminates the first standby position checking process. The number of steps of the motor 59 corresponding to the particular distance may be previously stored in the ROM 92 at the time of factory shipment.

When a specific distance in the sub scanning direction between the standby position WP (e.g., a provisional position identified as the standby position WP) and the position of the scanning device 4 at the point of time when the CPU 91 detects the change from the white pixels to the black pixels is identical to the particular distance in the sub scanning direction between the home position HP and the boundary between the white tape 13a and the black tape 13b, the CPU 91 may confirm that the standby position WP is coincident with the home position HP. Thus, the first standby position checking process includes checking whether the standby position WP is coincident with the home position HP. Meanwhile, when the aforementioned specific distance is not identical to the particular distance, the CPU 91 may confirm that the standby position WP is not coincident with the home position HP. In this case, the CPU 91 resets the standby position WP to be coincident with the home position HP.

<Second Standby Position Checking Process>

In the second standby position checking process, in the same manner as executed in S5121, the CPU 91 controls the motor 59 included in the moving mechanism 5, thereby moving the scanning device 4 from the standby position WP to the scanning start position PS (S1601).

Then, in the same manner as executed in S5122, the CPU 91 controls the scanning device 4 to start image scanning (S1602).

Thereafter, the CPU 91 determines whether the scan key 101 has been pressed on the standby screen (S1603).

When determining that the scan key 101 has been pressed on the standby screen (S1603: Yes), the CPU 91 controls the display 6 to display the scanning start screen (S1604). Thereby, the screen displayed on the display 6 is switched from the standby screen to the scanning start screen.

Afterwards, in the same manner as executed in S5123, the CPU 91 determines whether the scanning device 4 has scanned the boundary between the white tape 13a and the black tape 13b of the adjustment reference plate 13, i.e., whether the CPU 91 has detected a change in the scanned image data from white data to black data (S1605).

When determining that the CPU 91 has not detected a change in the scanned image data from white data to black data (S1605: No), the CPU 91 determines whether the scan key 101 has been pressed on the standby screen (S1603).

When the scanning start screen is being displayed on the display 6, the CPU 91 determines that the scan key 101 has not been pressed on the standby screen (S1603: No). In this case, the CPU 91 determines whether the CPU 91 has received an instruction to start image scanning in response to the start key 104 being pressed on the scanning start screen (S1606).

When the start key 104 is pressed on the scanning start screen (S1606: No), the CPU 91 determines whether the CPU 91 has detected a change in the scanned image data from white data to black data (S1605).

Before detecting a change in the scanned image data from white data to black data (S1605: No), in response to receiving an instruction to start image scanning (S1606: Yes), the CPU 91 controls the display 6 to display the scanning-in-progress screen (S1607).

When detecting a change in the scanned image data from white data to black data (S1605: Yes), in the same manner as executed in S5124, the CPU 91 terminates the image scanning by the scanning device 4 (S1608).

Further, in the same manner as executed in S5125, at a point of time when detecting the change from white pixels to black pixels, the CPU 91 controls the motor 59 included in the moving mechanism 5, thereby stopping the movement of the scanning device 4 (S1609).

Then, in the same manner as executed in S5126, the CPU 91 moves the scanning device 4 leftward by the particular distance between the home position HP and the boundary between the white tape 13a and the black tape 13b, thereby moving the scanning device 4 to the regular standby position WP (S1610). Thereafter, the CPU 91 terminates the second standby position checking process.

When a specific distance between the standby position WP (e.g., a provisional position identified as the standby position WP) and the position of the scanning device 4 at the point of time when the CPU 91 detects the change from the white pixels to the black pixels is identical to the particular distance between the home position HP and the boundary between the white tape 13a and the black tape 13b, the CPU 91 may confirm that the standby position WP is coincident with the home position HP. Thus, the second standby position checking process includes checking whether the standby position WP is coincident with the home position HP. Meanwhile, when the aforementioned specific distance is not identical to the particular distance, the CPU 91 may confirm that the standby position WP is not coincident with the home position HP. In this case, the CPU 91 resets the standby position WP to be coincident with the home position HP.

<Operations and Advantageous Effects>

As described above, the image scanning apparatus 1 includes the FB cover 3 configured to swing between the open position where the FB cover 3 is open relative to the platen glass 2 (the document placement surface 2a) and the closed position where the FB cover 3 is closed relative to the platen glass 2. When the FB cover 3 is in the open position, the user is allowed to set a document sheet M to be scanned on the platen glass 2 and remove the document sheet M from the platen glass 2. Further, the image scanning apparatus 1 includes the cover sensor 8 configured to output the ON signal or the OFF signal depending on whether the FB cover 3 is in the closed position or the open position.

While moving from the scanning start position PS to the scanning end position PE in a state where the document sheet M to be scanned is placed and supported on the platen glass 2, the scanning device 4 scans an image of the document sheet M. After image scanning of the document sheet M, the scanning device 4 is moved from the scanning end position PE to the scanning start position PS. When the FB cover 3 is opened during the movement of the scanning device 4 from the scanning end position PE to the scanning start position PS, the user may be in a hurry to set a next document sheet M on the platen glass 2. Meanwhile, when the FB cover 3 is not opened during the movement of the scanning device 4 from the scanning end position PE to the scanning start position PS, it is presumed that there is not any further document sheet M to be next scanned or that the user is not in a hurry to set a next document sheet M on the platen glass 2.

Hence, when the FB cover 3 is not opened and the cover sensor 8 does not output the OFF signal during the movement of the scanning device 4 from the scanning end position PE to the scanning start position PS, the first standby position checking process (hereinafter, which may be referred to as a "first operation") is performed, which includes checking whether the standby position WP is coincident with the home position HP.

Meanwhile, when the FB cover 3 is opened and the cover sensor 8 outputs the OFF signal during the movement of the scanning device 4 from the scanning end position PE to the scanning start position PS, a second operation is performed in which the scanning device 4 is moved to the scanning start position PS between the standby position WP and the scanning end position PE. It is noted that the second operation does not include checking whether the standby position WP is coincident with the home position HP.

Thus, according to aspects of the present disclosure, the image scanning apparatus 1 may check at appropriate timing whether the standby position WP is coincident with the home position HP. In the case where the image scanning apparatus 1 does not check whether the standby position WP is coincident with the home position HP, after the scanning device 4 moves from the scanning end position PE toward the scanning start position PS (for instance, to the standby position WP), the image scanning apparatus 1 moves the scanning device 4 to the scanning start position PS between the standby position WP and the scanning end position PE. Thereby, it is possible to quickly start image scanning of a next document sheet M. Therefore, it is possible to further improve a throughput of processing by the image scanning apparatus 1.

After image scanning of the document sheet M, the scanning device 4 is returned to the standby position WP. Therefore, when performing the first standby position checking process afterwards, the image scanning apparatus 1 may move the scanning device 4 from the standby position WP immediately after starting the first standby position checking process. Consequently, it is possible to shorten a period of time required to perform the first standby position checking process.

Further, when placing the scanning device 4 in the scanning start position PS after image scanning of the document sheet M, the image scanning apparatus 1 once returns the scanning device 4 to the standby position WP. Thereby, when moving the scanning device 4 from the scanning start position PS to the scanning end position PE, the image scanning apparatus 1 may reduce mechanical allowance and/or backlash (e.g., backlash of gears) of the moving mechanism 5. Consequently, the image scanning apparatus 1 may quickly move the scanning device 4 from the scanning start position PS to the scanning end position PE. Thus, it is possible to shorten a period of time required for image scanning.

When the image scanning apparatus 1 does not perform the first standby position checking process, after a lapse of the particular period of time without receipt of an instruction to start image scanning after the scanning device 4 is placed in the scanning start position PS, the image scanning apparatus 1 performs the second standby position checking process, in which the image scanning apparatus 1 checks whether the standby position WP is coincident with the home position HP. Thus, the image scanning apparatus 1 may check whether the standby position WP is coincident with the home position HP, in a vacant time in a case where the image scanning apparatus 1 does not perform image scanning of a next document sheet M.

Further, before performing the second standby position checking process, the image scanning apparatus 1 controls the display 6 to switch the screen displayed thereon from the scanning start screen to the standby screen. Therefore, to input an instruction to start image scanning of a next document sheet M, the user needs to switch the screen displayed on the display 6 from the standby screen to the scanning start screen. Accordingly, the image scanning apparatus 1 may perform the second standby position checking process by efficiently using a period of time before an instruction to start image scanning of a next document sheet M is input via the scanning start screen.

When receiving an instruction to start image scanning during execution of the second standby position checking process, the image scanning apparatus 1 controls the display 6 to display the scanning-in-progress screen. Then, after completion of the second standby position checking process, the image scanning apparatus 1 starts image scanning of the document sheet M. Therefore, the image scanning apparatus 1 may complete checking, in the second standby position checking process, whether the standby position WP is coincident with the home position HP, without being noticed by the user.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiment, the CPU 91 performs the processes exemplified in the embodiment. Nonetheless, the controller 9 may include a plurality of CPUs configured to perform the processes in cooperation with each other.

Associations between elements exemplified in the aforementioned illustrative embodiment and elements according to aspects of the present disclosure will be exemplified below. The image scanning apparatus 1 may be an example of an "image scanning apparatus" according to aspects of the present disclosure. The platen glass 2 may be an example of a "document table" according to aspects of the present disclosure. The FB cover 3 may be an example of a "cover" according to aspects of the present disclosure. The cover sensor 8 may be an example of a "cover sensor" according to aspects of the present disclosure. The image scanner 10 may be an example of an "image scanner" according to aspects of the present disclosure. In this case, the scanning device 4 and the moving mechanism 5 may be included in the "image scanner" according to aspects of the present disclosure. The controller 9 may be an example of a "controller" according to aspects of the present disclosure. In this case, the CPU 91 and the ROM 92 storing the programs 92a may be included in the "controller" according to aspects of the present disclosure. The adjustment reference plate 13 may be an example of a "black-white member" according to aspects of the present disclosure. The white tape 13a may be an example of a "white area" according to aspects of the present disclosure. The black tape 13b may be an example of a "black area" according to aspects of the present disclosure. The standby screen shown in FIG. 5 may be an example of a "standby screen" according to aspects of the present disclosure. The scanning start screen shown in FIG. 6 may be an example of a "scanning start screen" according to aspects of the present disclosure. The scanning-in-progress screen shown in FIG. 10 may be an example of a "scanning-in-progress screen" according to aspects of the present disclosure.

What is claimed is:

1. An image scanning apparatus comprising:
   a document table;
   a cover movable between an open position where the cover is open relative to the document table and a closed position where the cover is closed relative to the document table;
   a cover sensor configured to output a first signal when the cover is in the open position and output a second signal when the cover is in the closed position;
   an image scanner comprising a linear image sensor extending along a main scanning direction, the image scanner being configured to perform image scanning of a sheet placed on the document table while changing a scanning position of the image scanner along a sub scanning direction perpendicular to the main scanning direction; and
   a controller configured to:

control the image scanner to perform image scanning while changing the scanning position from a scanning start position to a scanning end position in the sub scanning direction;

after completion of the image scanning, control the image scanner to change the scanning position from the scanning end position toward the scanning start position;

determine whether the first signal is output from the cover sensor while the image scanner is changing the scanning position from the scanning end position toward the scanning start position; and in response to determining that the first signal is not output from the cover sensor while the image scanner is changing the scanning position, execute a first operation of checking whether a standby position is coincident with a home position, the standby position being opposed to the scanning end position across the scanning start position in the sub scanning direction; and in response to determining that the first signal is output from the cover sensor while the image scanner is changing the scanning position, execute a second operation, the second operation comprising controlling the image scanner to change the scanning position to a particular position between the standby position and the scanning end position in the sub scanning direction, without executing the first operation.

2. The image scanning apparatus according to claim 1, wherein the linear image sensor is movable along the sub scanning direction, and wherein the controller is configured to cause the linear image sensor to move along the sub scanning direction, thereby changing the scanning position of the image scanner.

3. The image scanning apparatus according to claim 2, wherein the particular position is the scanning start position.

4. The image scanning apparatus according to claim 3, wherein the controller is further configured to:

determine whether the linear image sensor is located at the standby position while the linear image sensor moves from the scanning end position toward the scanning start position; and in response to determining that the linear image sensor is located at the standby position, cause the linear image sensor to stop moving.

5. The image scanning apparatus according to claim 4, wherein the second operation further comprises controlling the linear image sensor to move from the standby position to the scanning start position.

6. The image scanning apparatus according to claim 2, further comprising a display and an operation interface, wherein the controller is further configured to:

after causing the linear image sensor to start moving from the scanning end position toward the scanning start position, control the display to display a scanning start screen, the scanning start screen being configured to receive an instruction to start image scanning via the operation interface;

after causing the linear image sensor to stop moving, and executing the second operation, when not receiving the instruction to start image scanning, perform the first operation; and after causing the linear image sensor to stop moving, and executing the first operation, when not receiving the instruction to start image scanning, not perform the first operation.

7. The image scanning apparatus according to claim 6, wherein the controller is further configured to:

after causing the linear image sensor to stop moving, when not receiving the instruction to start image scanning, control the display to display a standby screen, the standby screen being configured to receive an instruction to display the scanning start screen via the operation interface and not receive the instruction to start image scanning; and in response to displaying the standby screen, perform the first operation.

8. The image scanning apparatus according to claim 7, wherein the controller is further configured to:

in response to receiving the instruction to display the scanning start screen, control the display to display the scanning start screen.

9. The image scanning apparatus according to claim 8, wherein controller is further configured to:

after displaying the scanning start screen, in response to receiving the instruction to start image scanning, control the display to display a scanning-in-progress screen, the scanning-in-progress screen representing that the image scanning is in progress; and when controlling the display to display the scanning-in-progress screen, after completion of the first operation, start the image scanning.

10. The image scanning apparatus according to claim 6, further comprising a black-white member disposed between the home position and the scanning start position in the sub scanning direction, the black-white member having a black area and a white area arranged side by side in the sub scanning direction, wherein the first operation comprises:

controlling the image scanner to scan the black-white member while the linear image sensor moves from the standby position to the scanning start position; and in response to the image scanner scanning a boundary between the black area and the white area, controlling the linear image sensor to move by a particular distance toward the standby position, and wherein the controller is further configured to:

after moving the linear image sensor from the particular position to the standby position, perform the first operation.

11. The image scanning apparatus according to claim 6, wherein the controller is further configured to:

after executing the first operation, in a state where the scanning start screen is displayed on the display, determine whether the first signal is output from the cover sensor; and in response to determining that the first signal is output from the cover sensor, determine where the linear image sensor is located;

in response to determining that the linear image sensor is not located at the scanning start position, control the linear image sensor to move to the scanning start position; and in response to determining that the linear image sensor is located at the scanning start position, control the linear image sensor to stay at the scanning start position.

12. A method implementable on a processor coupled with an image scanning apparatus, the image scanning apparatus comprising:
- a document table;
- a cover movable between an open position where the cover is open relative to the document table and a closed position where the cover is closed relative to the document table;
- a cover sensor configured to output a first signal when the cover is in the open position and output a second signal when the cover is in the closed position; and
- an image scanner comprising a linear image sensor extending along a main scanning direction, the image scanner being configured to perform image scanning of a sheet placed on the document table while changing a scanning position of the image scanner along a sub scanning direction perpendicular to the main scanning direction, the method comprising:
- controlling the image scanner to perform image scanning while changing the scanning position from a scanning start position to a scanning end position in the sub scanning direction;
- after completion of the image scanning, controlling the image scanner to change the scanning position from the scanning end position toward the scanning start position;
- determining whether the first signal is output from the cover sensor while the image scanner is changing the scanning position from the scanning end position toward the scanning start position; and
- in response to determining that the first signal is not output from the cover sensor while the image scanner is changing the scanning position, executing a first operation of checking whether a standby position is coincident with a home position, the standby position being opposed to the scanning end position across the scanning start position in the sub scanning direction; and
- in response to determining that the first signal is output from the cover sensor while the image scanner is changing the scanning position, executing a second operation, the second operation comprising controlling the image scanner to change the scanning position to a particular position between the standby position and the scanning end position in the sub scanning direction, without executing the first operation.

13. A non-transitory computer-readable medium storing computer-readable instructions that are executable by a processor coupled with an image scanning apparatus, the image scanning apparatus comprising:
- a document table;
- a cover movable between an open position where the cover is open relative to the document table and a closed position where the cover is closed relative to the document table;
- a cover sensor configured to output a first signal when the cover is in the open position and output a second signal when the cover is in the closed position; and
- an image scanner comprising a linear image sensor extending along a main scanning direction, the image scanner being configured to perform image scanning of a sheet placed on the document table while changing a scanning position of the image scanner along a sub scanning direction perpendicular to the main scanning direction, the instructions being configured to, when executed by the processor, cause the processor to:
- control the image scanner to perform image scanning while changing the scanning position from a scanning start position to a scanning end position in the sub scanning direction;
- after completion of the image scanning, control the image scanner to change the scanning position from the scanning end position toward the scanning start position;
- determine whether the first signal is output from the cover sensor while the image scanner is changing the scanning position from the scanning end position toward the scanning start position; and
- in response to determining that the first signal is not output from the cover sensor while the image scanner is changing the scanning position, execute a first operation of checking whether a standby position is coincident with a home position, the standby position being opposed to the scanning end position across the scanning start position in the sub scanning direction; and
- in response to determining that the first signal is output from the cover sensor while the image scanner is changing the scanning position, execute a second operation, the second operation comprising controlling the image scanner to change the scanning position to a particular position between the standby position and the scanning end position in the sub scanning direction, without executing the first operation.

14. The non-transitory computer-readable medium according to claim 13,
wherein the linear image sensor is movable along the sub scanning direction, and
wherein the instructions are configured to, when executed by the processor, cause the processor to cause the linear image sensor to move along the sub scanning direction, thereby changing the scanning position of the image scanner.

15. The non-transitory computer-readable medium according to claim 14,
wherein the particular position is the scanning start position.

16. The non-transitory computer-readable medium according to claim 15,
wherein the instructions are further configured to, when executed by the processor, cause the processor to:
- determine whether the linear image sensor is located at the standby position while the linear image sensor moves from the scanning end position toward the scanning start position; and
- in response to determining that the linear image sensor is located at the standby position, cause the linear image sensor to stop moving.

17. The non-transitory computer-readable medium according to claim 16,
wherein the second operation further comprises controlling the linear image sensor to move from the standby position to the scanning start position.

18. The non-transitory computer-readable medium according to claim 14, further comprising a display and an operation interface,
wherein the instructions are further configured to, when executed by the processor, cause the processor to:
- after causing the linear image sensor to start moving from the scanning end position toward the scanning start position, control the display to display a scanning start screen, the scanning start screen being configured to receive an instruction to start image scanning via the operation interface;

after causing the linear image sensor to stop moving, and executing the second operation, when not receiving the instruction to start image scanning, perform the first operation; and after causing the linear image sensor to stop moving, and executing the first operation, when not receiving the instruction to start image scanning, not perform the first operation.

19. The non-transitory computer-readable medium according to claim 18, further comprising a black-white member disposed between the home position and the scanning start position in the sub scanning direction, the black-white member having a black area and a white area arranged side by side in the sub scanning direction, wherein the first operation comprises:
controlling the image scanner to scan the black-white member while the linear image sensor moves from the standby position to the scanning start position; and in response to the image scanner scanning a boundary between the black area and the white area, controlling the linear image sensor to move by a particular distance toward the standby position, and wherein the instructions are further configured to, when executed by the processor, cause the processor to perform the first operation after moving the linear image sensor from the particular position to the standby position.

20. The non-transitory computer-readable medium according to claim 18, wherein the instructions are further configured to, when executed by the processor, cause the processor to:

after executing the first operation, in a state where the scanning start screen is displayed on the display, determine whether the first signal is output from the cover sensor; and in response to determining that the first signal is output from the cover sensor, determine where the linear image sensor is located;

in response to determining that the linear image sensor is not located at the scanning start position, control the linear image sensor to move to the scanning start position; and in response to determining that the linear image sensor is located at the scanning start position, control the linear image sensor to stay in the scanning start position.

* * * * *